Figure 1:
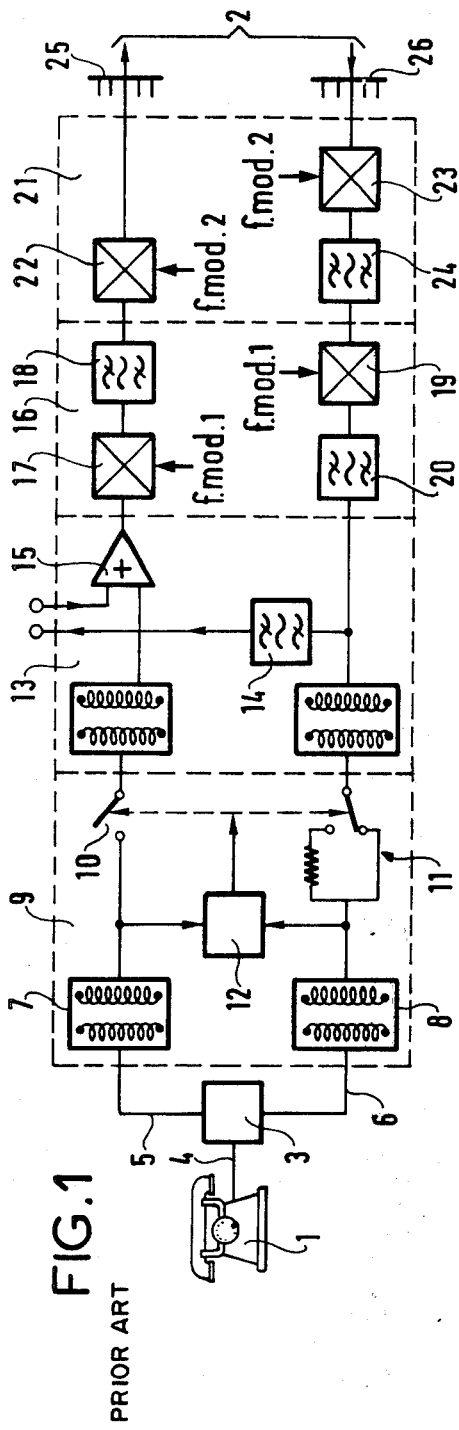

United States Patent [19]

Boulanger et al.

[11] 4,130,743

[45] Dec. 19, 1978

[54] TERMINAL EQUIPMENT FOR A MULTIPLEX CARRIER CURRENT TELEPHONE SYSTEM

[75] Inventors: Claude Boulanger, Chevilly Larue; Christian Poinas, Boulogne, both of France

[73] Assignee: Compagnie Industrielle des Telecommunications Cit-Alcatel, Paris, France

[21] Appl. No.: 821,218

[22] Filed: Aug. 2, 1977

[30] Foreign Application Priority Data

Aug. 24, 1976 [FR] France .............................. 76 25577

[51] Int. Cl.² ............................................. H04B 3/24
[52] U.S. Cl. .............................. 179/170.2; 179/170.6; 325/22
[58] Field of Search .............. 179/170.2, 170.6, 1 VC, 179/170.4, 170.8; 325/152, 21, 22; 343/175, 180

[56] References Cited

U.S. PATENT DOCUMENTS

| | | | |
|---|---|---|---|
| 2,251,028 | 7/1941 | Barney | 179/170.2 |
| 2,258,966 | 10/1941 | Bjornson | 179/170.2 |
| 2,295,153 | 9/1942 | Bjornson | 179/170.2 |
| 3,397,401 | 8/1968 | Winterbottom | 325/152 |
| 3,896,273 | 7/1975 | Fariello | 179/170.6 |
| 3,942,116 | 3/1976 | Ferguson | 179/170.6 |
| 3,985,979 | 10/1976 | Durand et al. | 179/170.6 |

*Primary Examiner*—Kathleen H. Claffy
*Assistant Examiner*—Randall P. Myers
*Attorney, Agent, or Firm*—Roland Plottel

[57] ABSTRACT

The invention relates to terminal equipment for a carrier current multiplex system with a half echo-suppressor and a channel modem. The attenuator which is inserted in the transmission chain is disposed after a first modulation stage, thereby taking advantage of the propagation time of the filters of the modem to reduce the apparent reaction of the attenuator.

3 Claims, 2 Drawing Figures

TERMINAL EQUIPMENT FOR A MULTIPLEX CARRIER CURRENT TELEPHONE SYSTEM

The invention relates to terminal equipment for a carrier telephone multiplex system comprising a differential half echo suppressor.

In long-distance telephone technology, multiplexing is effected by means of carrier frequencies, and two wires and two distinct amplification chains are provided for each direction of communication. Terminal equipment in such a system constitutes the interface between a two-wire subscriber line and the four-wire transmission line. This equipment comprises a modulator/-demodulator and a hybrid transformer or an analogous transistorized circuit which forms the junction between the two-wire line and the four-wire line. Further, this terminal equipment often includes a differential half echo suppressor which supervises the level of the signals on the transmission side and on the receiving side and inserts an attenuator of 60 dB for example, in the transmission chain, when the level of the reception signals is higher than the level of the transmission signals (simple reception of speech). By means of this echo suppressor, the looping of the speech signals via an imperfect hybrid transformer is avoided during simple speech operation.

Generally, the echo suppressor is situated between the hybrid transformer and the modulator/demodulator. When the near subscriber listens to the distant subscriber, the attenuator in the transmission chain is in service. When the near subscriber begins speaking, it is observed that the first syllables are cut off, since the echo suppressor must respond to the average value of the signal on the transmission channel during a period before taking the decision to withdraw the attenuator. If the reaction period of the echo suppressor is too short, it becomes too sensitive with respect to noise peaks and interference signals. Only the insertion of a delay line in the transmission channel would avoid the cutting of the first syllables, but this insertion is incompatible with the performance recommended by the CCITT with regard to blocking time characteristics.

The aim of the invention is to reduce this phenomenon of the first syllables being cut off.

The present invention provides terminal equipment for a carrier telephone multiplex system, the terminal comprising a modulator means in the transmission chain with at least one band filter, and a differential half echo suppressor with an attenuator in the transmission chain, and including transmission and reception speech detectors which control the insertion and withdrawal of the attenuator; the attenuator being disposed in the transmission chain after at least one first band filter of the modulator, the band filter inserting a transmission delay of the same order of magnitude as the response time of the speech detectors.

This new disposition of the attenuator in the modulator takes advantage of the signal propagation time in the filters of the modulator to reduce the apparent reaction time of the echo suppressor with a view to reducing the extent to which the first syllables of the near subscriber are cut off.

In a preferred embodiment of the invention, the attenuator is disposed in the carrier frequency input line of a second modulation stage.

Figure 2:
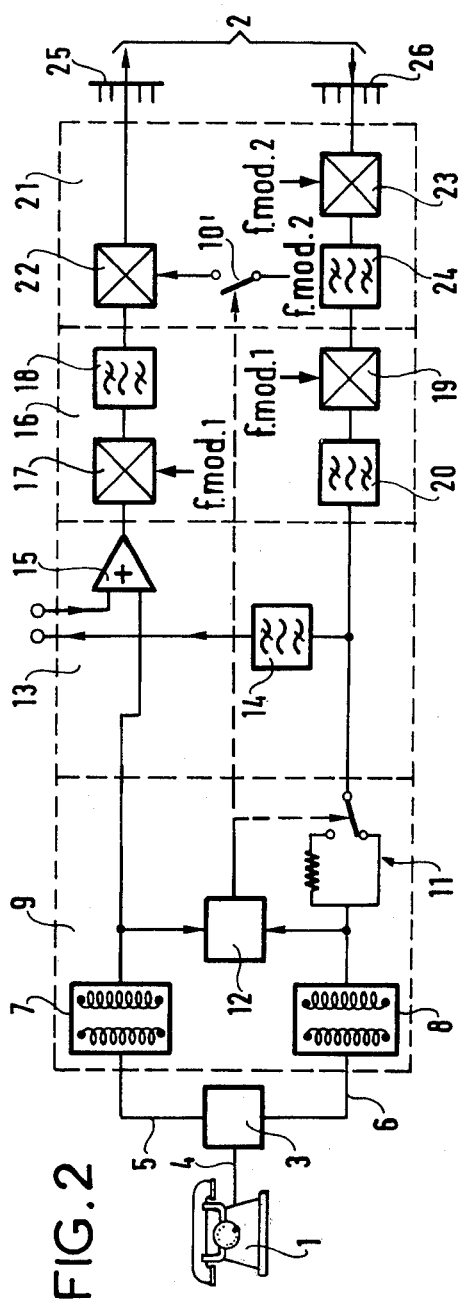

An embodiment of the invention will be described hereinbelow in greater detail by way of example with reference to the accompany drawing in which:

FIG. 1 shows schematically terminal equipment according to the state of prior art; and FIG. 2 shows the corresponding schematic drawing of terminal equipment embodying the invention.

In the two figures, elements having an identical or analogous function bear the same reference numeral.

A "state of the prior art" terminal equipment as shown in FIG. 1 is inserted between a subscriber set 1 and a cable 2 for long-distance transmission, and comprises successively:

a. A hybrid transformer 3 connecting a two-wire subscriber line 4 to a four-wire line having two pairs 5 and 6 of unidirectional wires;

b. a half echo suppressor 9 which is connected to the two pairs 5 and 6 via two isolating transformers 7 and 8 and which is provided on the transmission line with a blocker 10 acting as a transmission attenuator, and a 6-dB attenuator 11 in the receiving channel; the blocker and the attenuator are controlled by a circuit 12 receiving the level of the transmission and reception speech signals (such an echo suppressor is described e.g. in the review "Câbles et Transmission" No. 2, 1974, pages 168 to 177);

c. a signalling device 13 designed to insert signalling signals in the transmission channel and to extract similar signals from the receiving channel. If the signalling is at voice frequencies, this signalling device is provided with a receiving filter 14 and a summing device 15 on the transmission side;

d. a first modulation/demodulation stage 16 wich is provided with a first modulator 17 receiving a first carrier frequency f.mod.1 and with a first band filter 18; on the receiving side, there is a demodulator 19 receiving the same demodulation frequency f.mod.1 and a base band filter 20;

e. a second modulation/demodulation stage 21 which is provided on the transmission side with a modulator 22 receiving a carrier frequency f.mod.2 and on the receiving side with a demodulator 23 receiving the same demodulation frequency f.mod.2, followed by a filter 24.

The carrier frequencies are usually chosen so that the first modulation/demodulation stage 16 can be identical for all the channels and so that the second stage 21 will transpose the channel of the subscriber 1 to one channel among several frequency channels and vice-versa. The channels coming from different equipments are combined downstream from the modulator 22 and upstream from the demodulator 23 as symbolically shown by two connection points 25 and 26.

The different switching stages of a telephone exchange which provide a metallic connection between one terminal equipment and any one of the subscriber of the exchange in question, are not shown in this figure; they are generally situated between the transformer 3 and the transformers 7 and 8.

On referring now to FIG. 2 only the differences between the state of the art such as shown in FIG. 1 and the invention as embodied in FIG. 2 will be explained. The main difference resides in the fact that the blocker 10 is replaced by a blocker 10' which is situated in the second modulation/demodulation stage 21 on the admission channel for the carrier frequency f.mod.2. As in the state of the art, this blocker is controlled by the echo suppressor control circuit 12. It interrupts the carrier frequency f.mod.2 and thus makes it possible to block the second modulator 22. When the subscriber 1 intervenes in the dialogue, the circuit 12 sends out a signal controlling the closing of the contact of the blocker 10' and the insertion of the attenuation 11 in the receiving channel. Since the speech signal passes successively through the summing device 15, the modulator 17 and the band filter 18 between the point where the presence of speech on the transmission channel is measured, i.e. just after the isolating transformer, and the point where blocking is effected i.e. on the modulator, the propagation time of the speech signal between these two points is available between these two points for taking the average value of the transmission signal and to switch the blocker 10' without cutting off the first syllables. This propagation time depends in particular on the type of filter 18 which has very steep characteristics, this requiring a relatively long propagation time.

The association of the half echo suppressor to the channel modulator/demodulator and to the signalling device makes it possible to avoid redundancy of transmission elements, in particular of voice-frequency amplifiers, not shown in FIGS. 1 and 2 and of isolation transformers.

The invention is not limited to the example of embodiment described according to FIG. 2. Without going beyond the scope of the invention, the blocker 10' can be inserted in the voice signal transmission chain, for example after the filter 18 or after the modulator 22. Equipment embodying to the invention can also be adapted to bilateral data transmission requirements by equipping the circuit 12 with a neutralizer. Lastly, the control circuit 12 can be an analog or a digital circuit; in the latter case, this circuit can be used for several time multiplex terminal equipments.

What we claim is:

1. An improved carrier multiplex terminal of a type that includes a transmitting channel (5) and a receiving channel (6), said transmitting channel (5) including at least one modulating stage (16 or 21) with at least one band filter (18), said receiving channel (6) including at least one demodulating stage (23, 24 or 19, 20) with at least one band filter (24 or 20); a differential half-echo suppressor (12) having first and second inputs respectively bridged across said receiving and transmitting channels; and an attenuator (11) positioned in said receiving channel (6) and controlled by the output of said echo-suppressor (12), wherein the improvement comprises means (10'), responsive to the output of said echo-suppressor (12), for inhibiting the operation of said at least one modulating stage (16 or 21) during that interval of time wherein the speech level from a distant subscriber (26) exceeds the speech level from the local subscriber (1, 4, 3, 5), the propagation delay in said transmitting channel (5) between said bridged input to the echo-suppressor (12) and said modulator inhibiting means (10') substantially equalling the time required for said echo-suppressor (12) to switch from a first to a second state whereby the first syllables of each speech interval from said local subscriber are transmitted without interruption.

2. An improved carrier multiplex terminal according to claim 1 wherein the improvement comprises a first modulating stage (16) driven by a source of a first carrier wave (f.mod 1); and a second modulating stage (21), connected to the output of said first modulating stage (16), and driven by a source of a second carrier wave (f.mod 2); said modulator inhibiting means (10') comprising switch means interposed between said second modulating stage (21) and said source of the second carrier wave (f. mod 2).

3. An improved carrier multiplex terminal of a type that comprises a transmit path including, in succession, a first and a second modulation stage; a band-pass filter intermediate said first and second modulation stages; a receiving path including a demodulator means; a hybrid circuit for combining said transmit and receiving paths; and a differential, half-echo suppressor, which is fed by signals from said transmit and receiving paths, for controlling a receiving path attenuator and a blocking means, said blocking means comprising a switch which is situated in the carrier input line to said second modulation stage, wherein said attenuator and said blocking means are activated during that interval of time wherein the speech level from the local subscriber exceeds the speech level from a distant subscriber.

* * * * *